Nov. 3, 1959          E. F. COX          2,911,516
WELDING MACHINE FOR RAILS OR THE LIKE
Filed Feb. 25, 1958          3 Sheets-Sheet 3
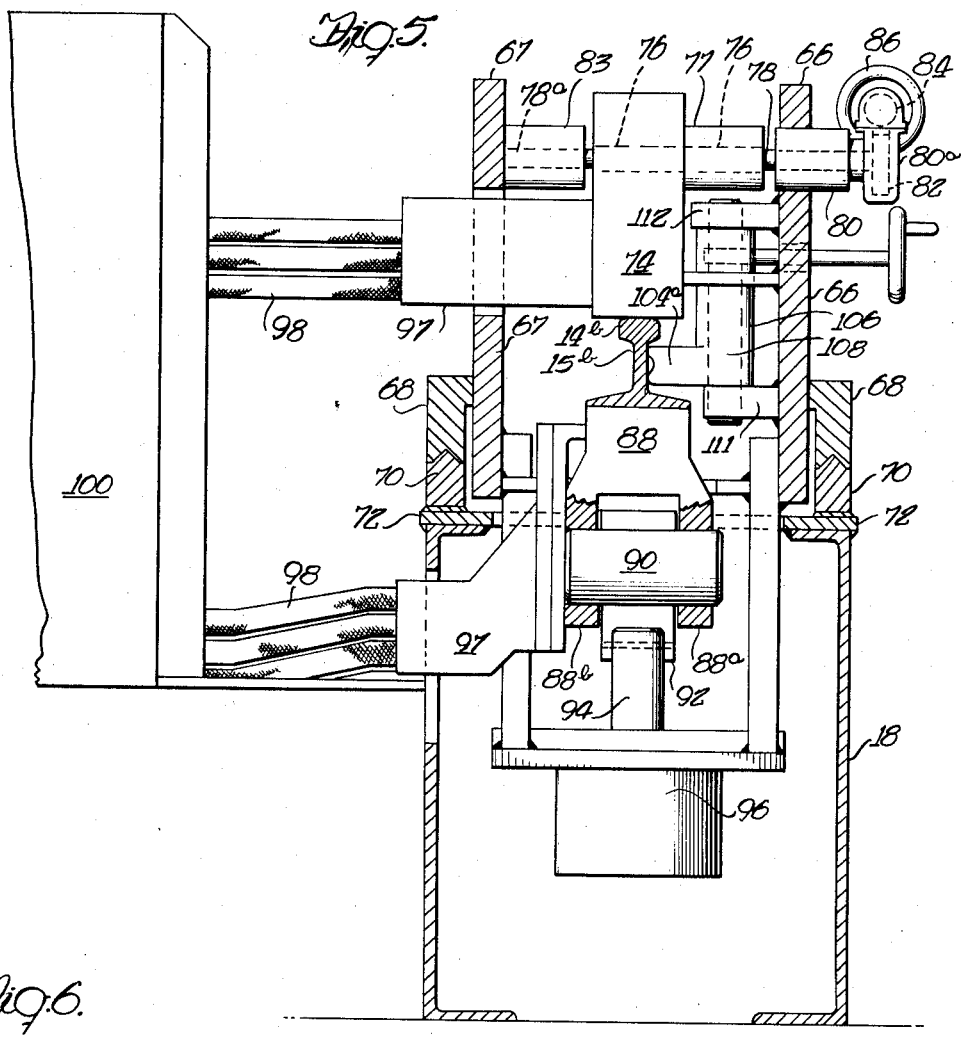
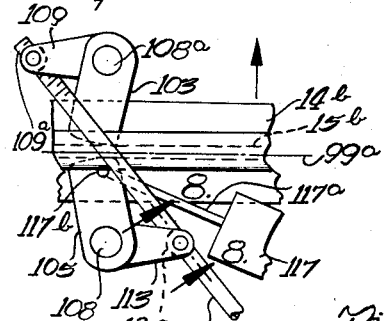
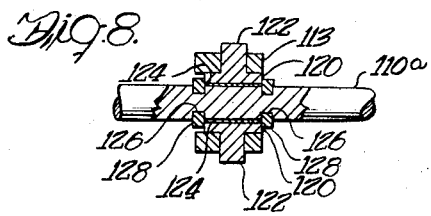
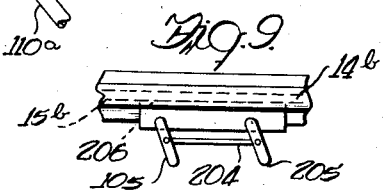
Inventor
Earle F. Cox
George E. Frost
Attorney

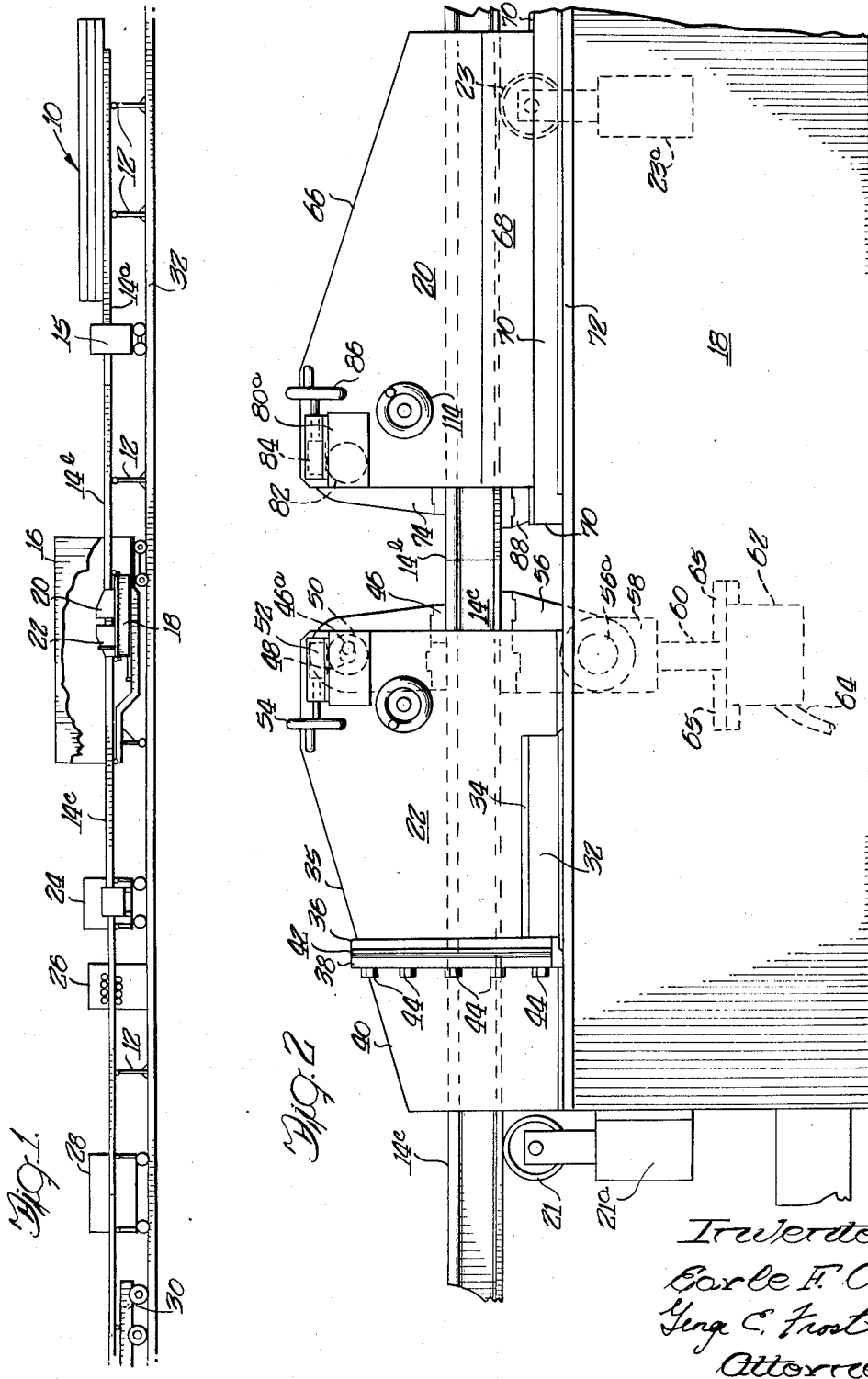

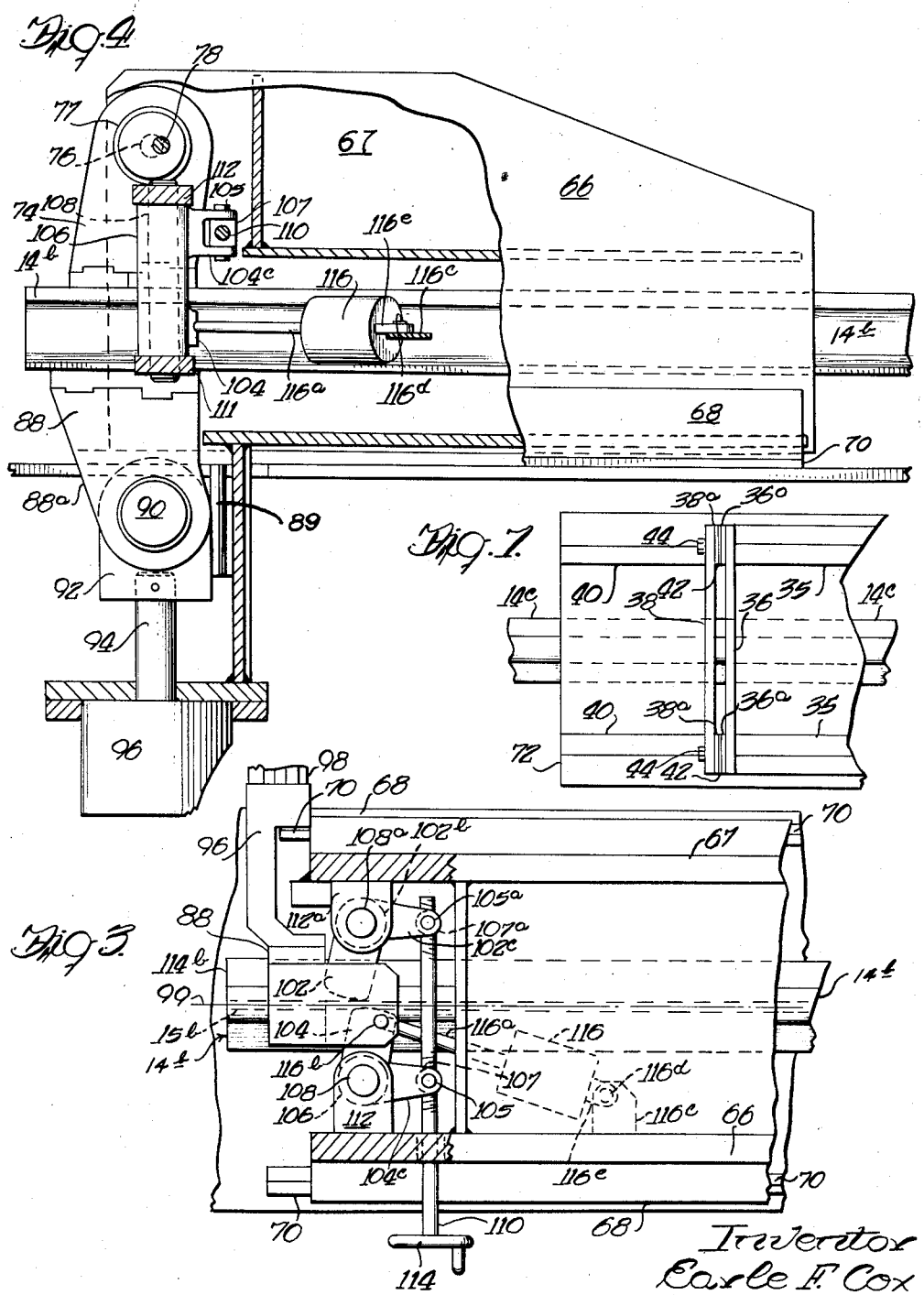

United States Patent Office 2,911,516
Patented Nov. 3, 1959

2,911,516

WELDING MACHINE FOR RAILS OR THE LIKE

Earle F. Cox, Chicago Heights, Ill.

Application February 25, 1958, Serial No. 717,524

14 Claims. (Cl. 219—101)

My invention relates to a welding machine for use in butt welding railroad rails or similar objects in which a fixed, insulated head carries one rail and a movable head carries the other rail.

In the apparatus of the present invention, the fixed and movable heads are each provided with clamp and gripping means to align the rails with their ends protruding for welding and to hold them against movement relative to the heads. In the welding operation, current flows from the fixed (insulated) head to the rail carried thereby to the other rail and then to the movable head to provide localized heating at the abutting rail ends for welding action. In the complete welding operation the ends of the rails are brought together by sliding the movable head (and the rail it carries) into engagement with the rail carried by the fixed head, applying an initial current flow to heat the abutting rail ends to welding temperature. The movable head is then drawn back to separate the abutting rail ends and to allow the heat to spread. This process is repeated until the rail end is uniformly heated to welding temperature. The upset operation is then performed by bringing the rail ends together under pressure to complete the weld.

The rails are gripped and indexed in each head by vertically acting jaws and horizontally jamming dogs. Each jaw pair includes a top jaw which serves as an indexing member and is movable over a limited range to adjust the vertical rail position. The rail is initially lifted by a jack located remotely from the joint to bear lightly against the upper jaw. After the horizontal jamming dogs have been set, a power operated complementary lower lifting jaw serves to press each rail into seating engagement with the top or indexing jaw. The horizontally jamming dogs also serve to index the rail in the lateral direction. These dogs define a nip which is the center of gripping action about the rail and the axis to which the rail is moved when the dogs are engaged. The dogs are adjustable relative to each other to vary the lateral position of the nip and thereby the position to which the rail is shifted. They are power actuated in unison to jam the rail from opposite sides and provide the gripping action required to anchor the rail against axial movement. In accordance with the several embodiments here shown, the dogs are arranged to act in similar or opposite axial directions as they jam against the rail as the designer prefers.

Further in accordance with the present invention the insulated head is insulatingly supported by sheet insulating material which is subjected only to compressive stress during operation of the machine.

It is therefore a general object of the present invention to provide an improved welding machine for rails or the like.

It is another object of the present invention to provide an mproved welding machine for rails or the like using heads with vertically movable jaws to position and clamp the rail in predetermined vertical position.

It is yet a further object of the present invention to provide an improved welding machine for rails or the like in which the rail is anchored in predetermined lateral position by dogs bearing against the rail web about a nip of adjustable lateral position.

It is still another object of the present invention to provide a welding machine for rails or the like in which the dogs are jammed against the rail on either side thereof to clamp the rail against any axial movement.

Still another object of the present invention is to provide an improved welding machine for rails or the like including a head unit having a vertically adjustable top indexing jaw and a power lifted lower jaw adapted to clamp the rail to predetermined vertical position seating against the top jaw.

Another object of the present invention is to provide an improved welding machine for rails or the like in which jacks are located remote from the abutting rail ends, without interfering with the later, more exact, rail positioning.

Yet another object of the present invention is to provide an improved welding machine for rails or the like having a head with power operated dogs which jam against the rail web in unison and anchor the same against axial movement in relation to the head.

Still another object is to provide an improved welding machine for rails or the like having dogs to grip the rail web and connected by a link of adjustable length to vary the nip defined by the dogs and thus the lateral position of the rail when the dogs are engaged.

A further object of the present invention is to provide an improved welding machine for rails or the like having rail-gripping jaws that grip with increased force as the rail is subjected to increased axial force.

Still another object of the present invention is to provide a welding device for rail or the like in which the rail is indexed and rigidly secured by horizontally and vertically acting means effective on the rail web and the top and bottom rail faces, respectively, in a common region adjacent the end to be welded.

Yet another object of the present invention is to provide a rail welding device in which a fixed head is insulatingly supported from a base and so arranged that the insulation is subjected only to compression under welding impact.

It is a further object of the present invention to provide a welding machine for rails or the like embodying features of construction, combination and arrangement making it simple and inexpensive in construction, reliable in operation, and adapted to practical rail-welding operation.

The novel features which I believe characteristic of my invention are set forth with particularity in the appended claims. My invention itself, however, both as to its organization and method of operation, together with further objects and advantages thereof, will be best understood by reference to the following description taken in conjunction with the accompanying drawings in which:

Figure 1 is a somewhat diagrammatic view of the complete welding process constructed in accordance with the present invention for a rail or the like;

Figure 2 is an enlarged, fragmentary view of the clamp mechanism constructed in accordance with the present invention;

Figure 3 is a top plan view of the movable head with parts broken away to show the construction;

Figure 4 is a side elevational view of the movable head with parts broken away to show the construction;

Figure 5 is an end view of the portion of the apparatus as seen from the left-hand end of Figure 3, with parts broken away to show the construction;

Figure 6 is a fragmentary top plan view of the dog rail gripping mechanism constructed in accordance with an alternative form of the present invention;

Figure 7 is a fragmentary top plan view of the back-up unit and adjacent portion of the insulated fixed head;

Figure 8 is an enlarged fragmentary cross-sectional view through section 8—8, Figure 6; and Figure 9 is a somewhat diagrammatic top plan view of the dog rail gripping mechanism constructed in accordance with an alternative form of the present invention.

General construction

Figure 1 shows in a somewhat diagrammatic view a complete unit for welding a plurality of comparatively short rails to form a lengthy rail and to deliver the lengthy rail to the site of installation. This mechanism includes a rail ramp or storage mechanism indicated generally at 10 in which a plurality of short rails are stored and are delivered to the rail supports 12 when ready to be used. The rail 14a, which is ready for use, is supported on supports 12 and travels through the scale removal device 15 which serves to remove the scale present on the rail after prolonged storage. Normally, the front end of the rail 14a is in abutting or closely spaced but unsecured relationship to the back end of the rail 14b which has either just been welded or is about to be welded. An additional support 12 sustains the rail 14b as shown.

The welding mechanism is mounted in the trailer 16. This may be a highway trailer, if desired, or in the alternative may be provided with wheels for rail operation. This mechanism, which is described in detail hereafter, includes a bed or frame 18, an uninsulated movable welder head 20, and an insulated fixed welder head 22. As is described in detail hereafter, the heads 20 and 22 have rail clamping and gripping elements which serve to clamp and grip the rail 14b and the rail 14c in tight fashion anchoring the same in a predetermined vertical position against axial movement and otherwise holding them for the welding process.

Downstream of the trailer 16 there is provided a flash removal mechanism 24 which serves to remove the flash formed during the welding process. The lengthy welded rail 14c then travels through the rail advancing mechanism 26 over support 12 to the inspection car 28 which may, for example, include various inspecting devices for the rail, to the flat cars 30 which extend for a sufficient distance to carry the entire length of a welded rail section.

The entire mechanism shown in Figure 1 is carried by the railroad rails 32 as shown.

In the operation of the welding mechanism comprising bed 18 and heads 20 and 22, the rail 14c, Figure 2, is partly supported by roller 21 and clamped and gripped tightly and held in fixed position by the action of fixed head 22 as hereinafter described in detail. The rail 14b is clamped and gripped tightly by the movable head 20 which is movably supported on the bed 18. During the welding operation an electric current flow takes place between rail 14b and rail 14c to heat the joint therebetween (since the electrical resistance at the abutting end is at a high value) and thereby melt the metal to form a weld.

More particularly, during the operation of the mechanism, the rail 14c is pulled by the advancing mechanism 26 to the point where it is approximately in the position shown in Figure 2, that is with its right end protruding a short distance from the head 22. The rail 14b is then brought to abutting position in relation to rail 14c and the vertical and lateral position of rail 14b adjusted as hereinafter described until the two rails are in aligned position. At this time the movable head 20 has clamped and gripped the rail 14b. The operator then passes an initial current flow between the rails 14b and 14c to heat their abutting ends to a softened condition. The head 20 and rail 14b are now both moved in the right hand direction of Figure 2 and then moved in the left hand direction to permit the heat to spread and uniformly heat the two surfaces to be welded. After the rail ends are heated to welding temperature, the upsetting cylinders force the two rail ends together, the current flow is interrupted, and the weld is completed. The rails are held in position until the welded joint is sufficiently cool, at which time the rail is ready to be shifted in the left hand direction of Figure 2 to bring a new rail 14a into position for welding. Successive rails are thus welded in end-to-end relationship until the desired length of welded rail is provided.

The rail gripping and supporting heads

The heads 20 and 22, Figure 2, serve to grip and support the rails 14c and 14b as above noted. The head 22 is immovably fixed on the bed 18 and is supported from the bed by the platen 32. Insulating sheet 34 is sandwiched between the head 22 and the platen 32 to provide electrical insulation. In addition, the support structures of the head 22, which includes the plates 35, Figure 7, terminates in a cross plate 36 which carries pads 36a, Figure 7. The pads 36a mate with the pads 38a which are formed on the complementary faces of backup plate 38 which is in turn rigidly supported from the base 18 by the backup side plates 40, Figures 2 and 7. As shown, insulating sheets 42 are interposed between the pads 36a and 38a, and the plates 36 and 38 are secured together by insulated bolts 44 as shown in Figure 2 to provide a rigid immovable support for the head 22. The pads 36a and 38a and insulation 42 are subjected only to a compressive stress when the movable head 20 forceably brings rail 14b against rail 14c as described above.

The bolts 44 may be insulated in any of the ways well known to the art. For example, each may be provided with a fiber washer (not shown) between its head and the backup plate 38, and an insulating fiber spacer sleeve telescoped over the shank of the bolt and received in the bolt-receiving hole in backup plate 38. Thus the bolts 44 are electrically connected to the cross plate 36, because they are threaded in that plate, and yet they do not destroy the insulating support for head 22.

The support plates 35 carry the gripping dogs which are brought into gripping relationship with the rail 14c and serve, together with vertical clamps 46 and 56, to anchor the rail 14c against axial movement. These dogs, plus the vertical clamps, hence take up the axial force on the rail 14c so that the insulating sheets 42 are subject to compressive stress determined by the amount of this axial force. These dogs are identical to those carried by movable head 20 and will be discussed more fully in relation thereto hereinafter.

The vertical position of the rail 14c is determined by the vertical position of the top or indexing jaw 46, which serves as a vertical reference member. The jaw 46 is pivotally supported by the shaft 48 which in turn is eccentrically positioned in relation to the pin 46a of the worm drive bull gear 50. The gear 50 is in turn rotated by worm wheel 52 operated by hand crank 54. Thus the indexing jaw 46 may be moved up and down to the extent of the vertical travel of the shaft 48 to an adjusted position giving the desired vertical height of the rail 14c.

The rail 14c is clamped upwardly and against the top jaw 46 by the bottom jaw 56. Jaw 56 is carried by stub shaft 56a which is in turn mounted on clevis 58. The latter is attached to the piston rod 60 which is forced upward by the piston and cylinder unit 62 as is described below in connection with the head 20. The cylinder 62 is a hydraulic cylinder and receives oil under pressure from a booster which is supplied by air under pressure through insulated hose 64. It is mounted on the mounting plate 65.

The movable head 20 is defined by a pair of side plates, 66 and 67, Figures 2 to 5. Outboard of these plates there are provided a pair of support members 68, Figures 2 and 5, which ride on the ways 70 as shown. The ways 70 are mounted on top plate 72 which is supported by the base 18 as seen best in Figure 5. As shown also in Figure 5, the top plate 72 has an elongated opening to receive the depending portion of the movable head 20 so that the head 20 (and the rail 14B carried thereby) is movable in the axial direction of the rail 14b, this movement being made possible by the sliding action of supports 68 on the ways 70. The movable head 20 has a top or indexing jaw 74, Figures 2–5, which serves to fix the position of the upper edge of rail 14b when in welding position.

This jaw rotatably receives the large shaft 76, Figures 4 and 5. As is best shown in Figure 5, the right hand portion of shaft 76 is carried by housing 77 which in turn is eccentrically supported from the side plate 66 by pin or shaft 78 which is carried by housing 80. Shaft 78a which eccentrically supports the left hand portion of shaft 76 is carried by housing 83 which is, in turn, mounted on side plate 67 as seen in Figure 5. The housing 80 terminates in housing 80a which covers the bull gear 82. Worm gear 84 meshes with bull gear 82 so that rotation of hand wheel 86 will rotate shaft 78. Since shaft 76 is eccentrically supported from shaft 78, rotation of hand wheel 86 will adjust the vertical position of indexing jaw 74 within the limits of eccentricity of shaft 76.

The rail 14b is clamped up against indexing jaw 74 by the bottom jaw 88, Figures 4 and 5. This jaw extends downwardly as shown in these figures to form clevis parts 88a and 88b. These clevis parts receive the stub shaft 90 which also receives the shoe 92 mounted on the end of piston rod 94, Figures 4 and 5. This piston rod is pushed upwardly when desired by the application of oil through hydraulic cylinder 96.

In operation, the operator initially sets the indexing jaw 74 to the desired vertical position by rotation of hand crank 86. The rail 14b is placed in position and the air is applied to cylinder 23a to lift roller 23. Following this, air is applied to cylinder 116 to accomplish horizontal clamping. Then oil is applied to cylinder 96 to lift piston rod 94, shoe 92, stub shaft 90 and the lower jaw 88 to force the rail 14b up snugly against the upper jaw 74.

The jaws 74 and 88 serve as electrical contact elements with the rail 14b. Each of these jaws receives the electrical connectors 97 and 98 which are of conventional type and serve to conduct the heavy welding currents from the source 100 to the rail without interfering with the axial sliding movements of the head 20.

The rail 14b is gripped against axial movement in relation to head 20 by vertical clamps and by the dogs 102 and 104. These dogs bear against the web 15b of rail 14b to anchor the same in position. As shown in Figure 5, the dog 104 has a jaw part 104a which bears against the web 15b. This jaw part is recessed to avoid interference with the markings that may be embossed on the face of the web 15b. The dog 104 also has sleeve portion 106 which is received on the shaft 108. The latter is supported from the side plate 66 by the trunnions 111 and 112 as shown. As will be apparent from Figure 3, when the dog 104 is rotated in the counterclockwise direction of that figure, the sleeve part 106, Figure 5, rotates with it. As also shown in Figures 3 and 4, the dog 104 is provided with a clevis 104c which extends generally in the direction of the axis of rail 14b. At its outer end the clevis 104c receives pin 105 which is attached to the threaded follower 107 as best seen in Figure 4. The follower member 107 is received on the threaded link 110 as described in further detail hereafter. The dog 102 is similarly supported from the guide plate 67 by the trunnion 112a, Figure 3, which receives the shaft 108a to support the dog 102 from its sleeve part 102b. The dog 102 also has a clevis 102c extending generally in the direction of axis of rail 14b as shown in Figure 3. Shaft 105a is mounted on the threaded follower member 107a and is received by clevis 102c in fashion similar to the pin 105, Figure 4.

The link 110 terminates in a hand crank 114, Figure 3. By rotating this crank the operator can shift the clevis parts 107 and 107a in opposite directions or, to state it differently, vary the length of the link 110. This is due to the fact that the portion of link 110 received on follower 107 (and also follower 107) have threads of one sense, such as right hand threads, and the portion of the link 110 received on the follower 107a (and also follower 107a) have threads of the opposite sense, for example, left hand threads. Thus the effect of rotating the hand crank 114 and the link 110 is to move the clevis parts 102c and 104c towards each other or away from each other, depending on the direction of rotation. This rotates the dogs 102 and 104 in opposite direction and thereby brings one dog into more engagement with the web of the rail 14b and the other dog out of engagement with the web.

It will be noted that the dogs 102 and 104 approach the web of the rail from opposite sides in jamming action. They thus define a nip which is centrally located in relation to the points of contact of the dogs against the rail. This nip is identified by axis 99, Figure 3. The action of the dogs—when engaged—brings the rail into alignment with the nip and simultaneously grips the rail to anchor the same against axial movement. Moreover, rotation of link 110, Figure 3, shifts the nip defined by the dogs and thus shifts the lateral position of the rail. In the appended claims the term nip is used to define the center of action of the dogs as above described.

The dogs 102 and 104 are engaged simultaneously by the air cylinder 116, Figures 3 and 4. When air is applied to this cylinder the piston rod 116a is pushed out of the cylinder. This piston rod is pivotally connected by pin 116b to the dog 104 so that the net effect of applying air to cylinder 116 is to rotate the dog 104 in the counter clockwise direction as seen in Figure 3, and hence bring that dog into engagement with the web of the rail. The rotations of that dog are transmitted through clevis 104c, link 110 and clevis 102c to the dog 102 which is rotated in clockwise direction. This brings the dog 102 into engagement with the opposite side of the rail so that the net effect of applying air to the cylinder 116 is to bring the dogs into jamming engagement on opposite sides of the web of the rail. The cylinder 116 is supported from the side plate 66 by an ear 116c which carries pin 116d and swingably receives ear 116e of the cylinder 116. The piston is thus supported in a manner that accommodates the limited swinging movement it must execute as it swings the dog 104 into jamming engagement. In the structures of Figures 1–5, inclusive, the dogs 102 and 104 approach the web of the rail 14b in opposite directions during the jamming engagement. With this construction any tendency of one dog to shift the rail 14b is compensated by a like tendency of the other dog, so that the rail is not axially shifted when the dogs engage.

Where the rail 14b is subjected to particularly heavy axial pounding loads during the course of the welding operation it is desirable to arrange the dogs 102 and 104 so their own jamming action tends to increase the grip on the rail under this force. Figures 6 and 8 show an alternative construction serving this purpose. Dogs 103 and 105 are positioned on opposite sides of web 15b of rail 14b. These dogs are provided with clevis parts 109 and 113, respectively, extending in opposite directions from each other. Link 110a extends across the plane defined by the axes of rotation of the dogs and is received in clevis parts 109 and 113. Link 110a is threaded at the portion near clevis 109 and is threadedly received in follower 109a of clevis 109 in the same manner as described above in relation to dogs 102 and 104. Link 110a is fixedly received in clevis 113 so that the link 110a cannot axially move with respect to clevis 113 but is rotatable within said clevis. As shown in Figure 8, follower 120 is received on clevis 113 by pins 122. Follower 120 is mounted on journal 124 which in turn is mounted on link 110a so that link 110a is rotatable within the journal 124. The link 110a is provided with a circular cut-out 126 on either side of follower 120. Lock washers 128 are received in cut-outs 126. Thus link 110a is freely rotatable within follower 120 but cannot move axially with respect thereto.

It will be noted that dogs 103 and 105 define a nip in much the same manner as dogs 102 and 104, Figure 3. The nip is identified by axis 99a. Rotation of link 110a will either draw clevis parts 109 and 113 towards each other or away from each other. If drawn away from each other, dogs 103 and 105 will rotate in the clockwise direction thereby shifting the nip which also operates to change the lateral position of the rail in the direction of the arrow as shown.

Once the link 110a has been adjusted to provide the desired lateral position of the nip, air cylinder 117 may be operated. This cylinder is double acting. Application of air pressure on one side will cause piston rod 117a to push dogs 103 and 105 in the opening direction. Application of air to the other side of cylinder 117, moves rod 117a in the dog-closing or jamming direction. Piston rod 117a is connected to dog 105 by means of pin 117b. Thus, by proper application of the air, dogs 103 and 105 are jammed against web 15b of rail 14b. Additionally, heavy axial pounding of rail 14b against rail 14c during the welding process will cause dogs 103 and 105 to jam even further against web 15b thereby further insuring against undesirable axial movement during the welding process. When it is desired to release rail 14b from the grip of dogs 103 and 105, air under pressure is supplied to cylinder 117.

If desired, the dogs 102 and 104, Figure 3, and the dogs 103 and 105, Figure 6, may be provided with pivoted shoes to seat flat against the rail web. Moreover, such shoes may be elongated and supported by parallelogram linkage arrangement to provide action similar to that above described. As shown diagrammatically in Figure 9, with this modification, the dog 105 has a slave dog 205 connected by link 204. The shoe 206 is pivotally affixed to both dogs to move parallel to the rail web at all times. As shown in Figure 9, the dogs 105 and 205 may have more narrow arms than dogs 102 and 104, Figure 3, and dogs 103 and 105, Figure 6, since the shoe 206 (and not the dogs) engages the web 15b of rail 14b.

The movable head 20 which carries rail 14b is slideably supported on ways 70. During the welding process, head 20 withdraws from fixed head 22 and then moves back at a regulated rate beyond its original position until the upset cylinders operate through head 20 to force the end of rail 14b against the end of 14c. Head 20 is movably operated by any conventional means available, such as a hydraulic cylinder (not shown).

The cylinder 96, rod 94, and member 92 are relieved of any possible force in the direction of the axis of rail 14b by the stop plate 89, Figure 4, against which the member 92, and preferably the clevis arms 88a and 88b, bear. This stop plate is preferably adjustably supported by suitable means (not shown) to compensate for wear.

The total force holding the rail against axial movement is the aggregate of the grip achieved by the top and bottom clamps and the jamming action of the dogs. In the foregoing description, and the appended claims, the action of the dogs in providing this anchorage is emphasized because they provide camming or jamming action that is effective to this end. However, the top and bottom clamps serve a rail anchoring function and may be designed to take up any desired proportion of the axial load.

The ways 70, Figure 5, are shown as simple rails supporting the support members or sliding rails 68. Preferably a hold-down structure (not shown) is employed to resist any force tending to separate either of the rails 68 from the ways 70. Such force may be developed by cam action when the butt ends of the rails are being forced together for welding. The hold-down structure may take the form of a protruding longitudinal key on each way 70, which receives on at least its bottom face one or more followers affixed to the corresponding support member 68. The position of the follower is made adjustable to take up for wear.

As above described, the rails are physically lifted by the rollers 21 and 23 under the action of the cylinders 21a and 23a. These lift the rails to light contact with the top jaws 46 and 74. The dogs are thereafter engaged to position the rails laterally of their axes, which movement is possible because of the light contact between the top jaws and the rails. Thereafter the lower jaws 56 and 88 are raised, engage the bottom faces of the rails, and then apply the heavy upward clamping force to grip the rails securely. Under this force the rails are lifted only to a slight degree as required to provide the requisite grip.

It will be observed that the dogs 102 and 104, when jammed, exert a movement on the rail web forcing the same to a true vertical position. This movement serves to line up the rail webs and assure a good welded joint even though one or both rails are twisted and otherwise would not align properly.

It will be further observed that the dogs 102 and 104, Figure 3, and the top and bottom clamps 74 and 88, Figure 4, act on the same region longitudinally of the rail and that this is close to the end to be welded. This assures a rigid indexing of the rail end, since only a very short length of rail can flex during the weld process, and this short length acts as a very short beam or column in compression that does not flex appreciably.

While I have shown and described specific embodiments of the present invention it will, of course, be understood that alternative forms may be provided without departing from the true spirit and scope thereof. I therefore intend by the appended claims to claim all such modifications and alternative constructions falling with their true spirit and scope.

What I claim as new and desire to secure by Letters Patent of the United States is:

1. A clamp mechanism for use in butt welding rails or other objects with a longitudinal axis comprising in combination: means to clamp the rail with its axis horizontal and in predetermined vertical position; a first dog located on one side of the rail and adapted to swing about a vertical axis to jam against the side of the rail; a second dog complementary to said first dog located on the other side of the rail and adapted to swing about a vertical axis to jam against the other side of the rail, said first and second dogs defining a nip; a link of adjustable length joining the dogs operable to shift the nip defined by the dogs to shift the lateral position of the rail when clamped; and means to swing one of the dogs in jamming direction to jam the dogs in unison against the rail and hold the same in predetermined axial position to anchor it against axial movement.

2. A clamp mechanism for use in butt welding rails or other objects with a longitudinal axis comprising in combination: means to clamp the rail with its axis horizontal and in predetermined vertical position; a first dog located on one side of the rail and adapted to swing about a vertical axis to jam against the side of the rail; a second dog complementary to said first dog located on the other side of the rail and adapted to swing about a vertical axis to jam against the other side of the rail, said first and second dogs defining a nip; a link of adjustable length joining the dogs operable to shift the nip defined by the dogs to shift the lateral position of the rail when clamped, the dogs being adapted to engage the rail from opposite directions axially of the rail; and means to swing one of said dogs in jamming direction to jam the dogs in unison against the rail and hold the same in predetermined axial position to anchor it against axial movement.

3. A clamp mechanism for use in butt welding rails or other objects with a longitudinal axis comprising in combination: means to clamp the rail with its axis horizontal and in predetermined vertical position; a first dog located on one side of the rail and adapted to swing about a vertical axis to jam against the side of the rail; a second dog complementary to said first dog located on the other side of the rail and adapted to swing about a vertical axis to jam against the other side of the rail, said first and second dogs defining a nip; a link of adjustable length joining the dogs operable to shift the nip defined by the dogs to shift the lateral position of the rail when clamped, the dogs being adapted to engage the rail from the same direction axially of the rail; and means to swing both dogs in jamming direction against the rail and hold the same in predetermined axial position to anchor it against axial movement.

4. A mechanism to clamp a rail with its horizontal axis in predetermined vertical position comprising in combination: an indexing jaw; shaft means having an axis of rotation and pivotally and pendulously supporting said indexing jaw from an axis offset in relation to the axis of rotation; a bottom jaw in complementary spaced relation to said indexing jaw; means to raise the bottom jaw and rail positioned thereon to clamp said rail against the indexing jaw; and means selectively operable to rotate said shaft means to raise and lower said indexing jaw.

5. A movable head mechanism to clamp and grip a rail with its horizontal axis in predetermined vertical and lateral position comprising in combination: a fixed base defining a pair of spaced parallel horizontal ways; side plates vertically riding on said ways; an indexing jaw; shaft means on said plates having an axis of rotation and pivotally and pendulously supporting said indexing jaw from an axis offset in relation to the axis of rotation; a bottom jaw in complementary spaced relation to said indexing jaw; means to clamp the bottom jaw with said rail positioned thereon to lift the rail against the indexing jaw; means selectively operable to rotate said shaft means to raise and lower said indexing jaw; complementary dog means carried by said side plates and located on opposite sides of said rail to define a nip and adapted to swing about vertical axes, respectively, to jam against the opposite sides of the rail; a link of adjustable length joining the dogs and operable to shift the nip defined by the dogs to shift the lateral position of the rail when clamped; and means to swing the dogs in jamming engagement against said rail to anchor same against axial movement with respect to said movable head.

6. A blow resisting clamp mechanism for a rail or the like having a longitudinal axis, comprising in combination: a base; a clamping head supported by the base, said head including a pair of spaced vertical side plates each terminating in a vertical pad and means to clamp the rail in horizontal position between the plates; insulation means interposed between the base and the clamping head to insulate the latter; a backup unit located adjacent the vertical pads of said side plates, rigidly affixed to said base, and defining a pair of vertical pads complementary to and in registration with the pads of said clamping head; sheet insulation interposed between the pads of the backing unit and the pads of the clamping head, respectively; and, insulating means attaching the pads together, whereby the clamping head insulatingly and rigidly supports the rail and the insulation is subjected only to compressive stress.

7. A device to weld rails having a predetermined axis comprising in combination: a base; a back plate vertically supported on the base; a fixed head insulatingly carried by the base and having a back face complementary to and seated against the back plate; an insulating sheet interposed between the said back face and said back plate; a movable head carried by the base and slidably movable in the direction of said axis; each of said heads having a top jaw of selectable vertical position and a bottom jaw complementary to the top jaw; means to lift the bottom jaw to clamp the rail against the top jaw; dogs swingable against the web of the rails; means to swing the dogs in unison to shift to the center of action of the dogs and thus the lateral position of the rails; and means to swing the dogs to jamming engagement against the rail to anchor the same against axial movement in relation to said heads.

8. A dog mechanism to position laterally a rail with a horizontal axis and to anchor same against axial movement comprising in combination: a pair of complementary dogs located on opposite sides of said rail to define a nip and adapted to swing about vertical axes to jam against opposite sides of said rail; a threaded follower on each dog and located in spaced relation to the axis thereof, each follower being threaded in opposite sense to the other follower; a link joining said followers, the link having threads of opposite sense and received in each follower, respectively, so that rotation of said link shifts the nip defined by the dogs to shift the lateral position of the rail when clamped; and means to swing one dog in jamming direction against the rail and thereby swing the opposite jaw in jamming direction through the medium of the link.

9. A device to clamp a rail with a longitudinal axis in predetermined vertical position including a dog mechanism to shift the rail laterally and anchor same against axial movement comprising in combination: a base; side plates vertically supported by said base; means interposed between said side plates to clamp the rail with its axis horizontal and in predetermined vertical position; a pair of complementary dogs located on opposite sides of said rail to define a nip, each dog being mounted on said side plates to swing about a vertical axis to jam against opposite sides of said rail; a threaded link of adjustable length protruding through an enlarged opening in one of said side plates; means outboard one of said plates to rotate said threaded link and operable to shift the nip defined by the dogs to shift the lateral position of the rail when clamped; and means to swing the dogs in jamming engagement with the rail to anchor the same against axial movement.

10. A dog mechanism to position a rail with its horizontal axis in predetermined lateral position and to anchor the same against axial movement comprising in combination: a pair of complementary dogs located on opposite sides of said rail to define a nip and adapted to swing about vertical axes to jam against each side of said rail; pivoted followers on the dogs, respectively, located at spaced positions in relation to their axes, respectively; a lengthy link having an axis joining said followers, said link being rotatable but axially unmovable in one follower and threadedly received in the other follower so that rotation of said link varies the distance between said followers to shift the nip defined by the dogs and the lateral position of the rail when clamped; and means to swing one dog in jamming direction against the rail and thereby swing the opposite dog in jamming direction through the medium of the link.

11. A device to clamp a rail with a longitudinal axis in predetermined vertical position including a dog mechanism to position the rail laterally and anchor same against axial movement comprising in combination: a base; vertical side plates supported by said base; means interposed between said side plates to clamp the rail with its axis horizontal and in predetermined vertical position; a pair of complementary dogs located on opposite sides of said rail to define a nip, said dogs being mounted on said side plates to swing about vertical axes to jam against said rail on its opposite sides; a link extending substantially parallel to the plane defined by said axes and pivotally affixed to the dogs at points spaced from their axes respectively, said link including thread means adapted when rotated to vary the length of the link between the dogs; means outboard said side plates for rotating said link to adjust the length of the link between the dogs to shift the nip defined by the dogs and hence the lateral position of the rail when clamped; and means to swing the dogs in jamming engagement with the rail to anchor the same against axial movement.

12. A device to clamp a rail with a longitudinal axis in predetermined vertical position including a dog mechanism to shift the rail laterally and anchor same against axial movement comprising in combination: a base; vertical side plates supported by the said base; means interposed between said side plates to clamp the rail with its axis horizontal and in predetermined vertical position; a pair of complementary dogs located on opposite sides of said rail to define a nip, said dogs being mounted on said side plates to swing about vertical axes to jam against said rail on its opposite sides; a link extending through the plane defined by said axes pivotally affixed to the dogs at points spaced from their axes, respectively, said link including thread means adapted when rotated to vary the length of the link between the dogs; means outboard said side plates for rotating said link to adjust the length of the link between the dogs to shift the nip defined by the dogs and hence the lateral position of the rail when clamped; and means to swing the dogs in jamming engagement with the rail to anchor the same against axial movement.

13. A mechanism to clamp a rail with its horizontal axis in predetermined vertical position, comprising in combination: an indexing top jaw; means supporting said top jaw to receive the top face of a rail or the like; a bottom jaw in complementary spaced relation to said indexing jaw and adapted to receive the bottom face of a rail or the like; piston means adapted to raise the bottom jaw and the rail thereon; means including a clevis and a pin connecting the piston means to the bottom jaw; and means defining a top stop face against which said last means slides and bears to take up the force on the bottom jaw associated with axial pressure on the rail.

14. In a welding device for butt welding the end of a rail or the like having top and bottom faces and a web, the combination of: top and bottom clamp members located adjacent said end of the rail; means to press said members against the top and bottom of the rail to index and anchor the same, said members defining a vertical space substantially equal to the height of the rail; side clamp members located in said vertical space and operable in continuous motion to fit against the opposite sides of the rail web in the same region as said top and bottom clamp members, and means to press said side clamp members together against the rail web to index the rail laterally and to anchor the same.

References Cited in the file of this patent

UNITED STATES PATENTS

| | | |
|---|---|---|
| 2,212,393 | Dalton | Aug. 20, 1940 |
| 2,250,869 | Jones et al. | July 29, 1941 |
| 2,787,698 | Schlatter et al. | Apr. 2, 1957 |